United States Patent Office 2,920,670
Patented Jan. 12, 1960

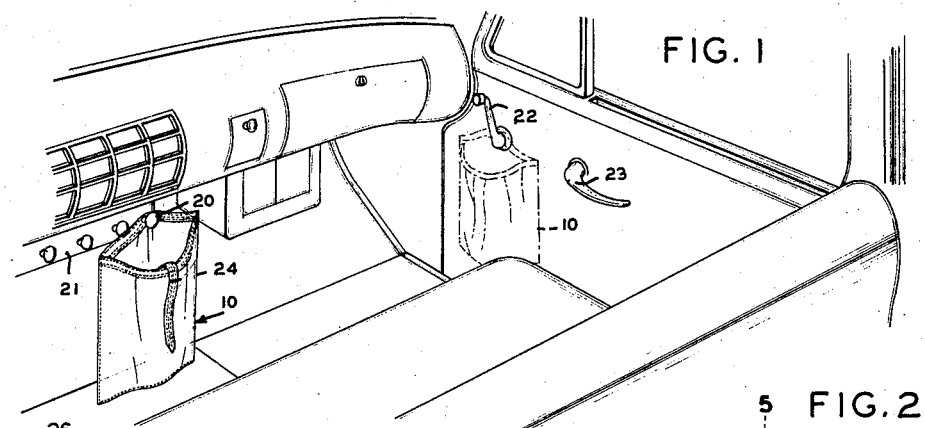
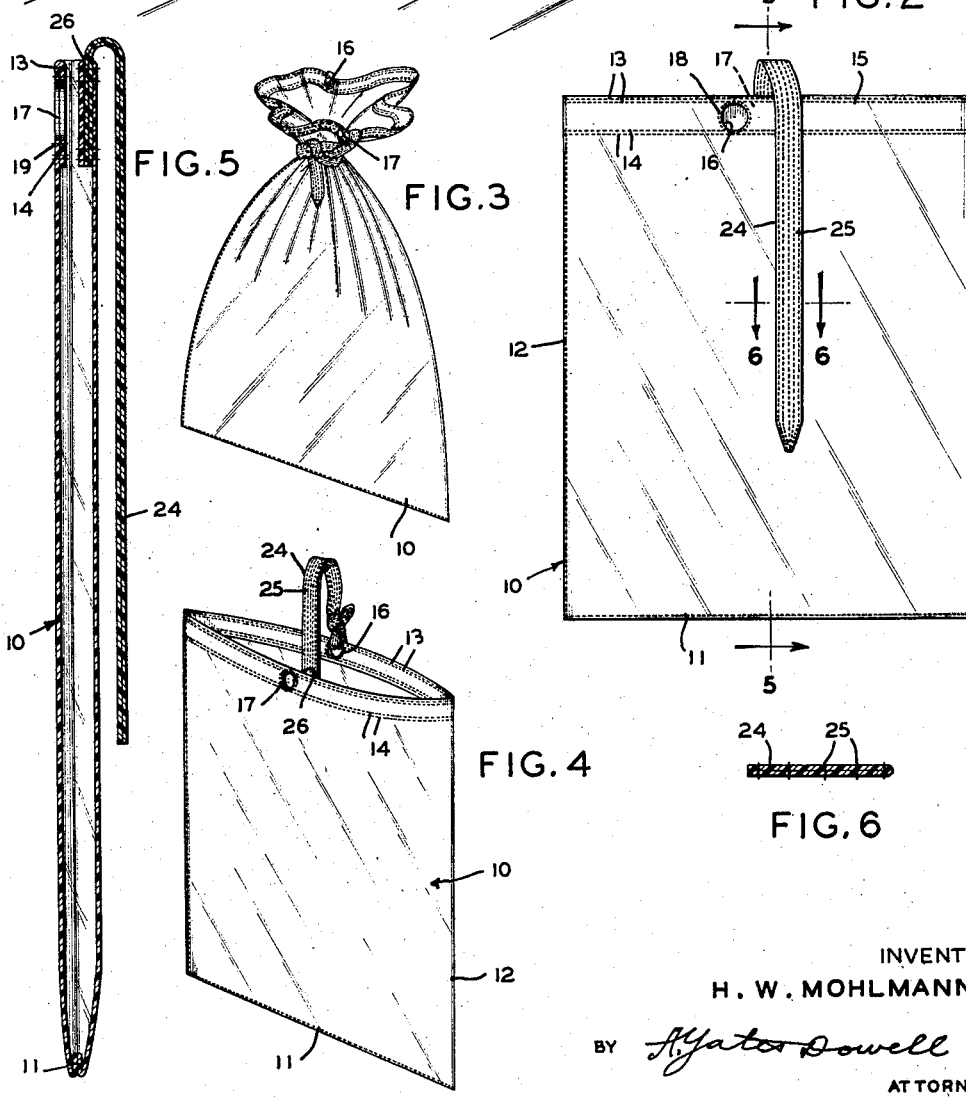

2,920,670

LITTER BAG

Harry W. Mohlmann, De Armanville, Ala.

Application September 2, 1958, Serial No. 758,480

4 Claims. (Cl. 150—.5)

This invention relates to containers such as waste baskets and other collection receptacles used in the collection of discarded articles and more particularly to a bag or the like which can be contained in a relatively small space until used.

The invention relates more particularly to a collection receptacle capable of being used in automobiles and other places for the collection of discarded paper, wrappings, bottles and the like, and which can be suspended on a suitable support in a convenient location and subsequently removed and emptied.

It is well known that when travelling in motor vehicles wrappings of edibles and non-edibles are removed and due to civic pride and legal restrictions these may not be thrown from a vehicle and, consequently, substantial waste accumulates in the vehicles and creates a problem particularly since some of such articles are likely to fall beneath the brake or accelerator pedal or other location in which they are physically in the way or they distract the attention of the operator thereby creating a hazard.

It is an object of the invention to solve the trash problem and to provide a simple, inexpensive, yet substantial collection receptacle which may be used for a time and discarded if desired, but by the use of which the interior of the automobile may be maintained neat in appearance and free of hazards from trash.

Another object of the invention is to provide a plastic bag or container for refuse which also will retain liquid, can be hung on a handle knob or other protrusion and provided with a strap which may be adjusted in accordance with the needs or desires and used not only to fasten the bag in place but also to fasten it in closed position.

A further object of the invention is to provide an attractive durable semi-permanent liquid-proof envelope having a reinforced open end with a utility strap attached to one side of the same and a pair of oppositely disposed knob or projection receiving openings.

Other objects and advantages of the invention will be apparent from the following description taken in conjunction with the accompanying drawing wherein:

Fig. 1 is a perspective illustrating one application of the invention to the instrument panel of an automobile;

Fig. 2, a side elevation of the empty bag or envelope;

Fig. 3, a perspective illustrating the manner of fastening the mouth of the bag in closed position;

Fig. 4, a perspective illustrating the strap used as a handle;

Fig. 5, a longitudinal section through the bag on the line 5—5 of Fig. 2; and

Fig. 6, a transverse section through the strap.

Briefly stated, the present invention is a semi-permanent liquid-proof envelope or bag of a relatively inexpensive but durable plastic having a relatively wide reinforcing band around its mouth and with openings at opposite locations through such reinforcing band and with a utility strap attached between the inner and outer layers thereof so that it may be tied through the other opening and used for supporting the bag in position, as a handle or carrying strap, or used for securing the mouth of the bag in closed position.

With continued reference to the drawing, a bag for the collection of waste in accordance with the present invention comprises an envelope 10 of attractive, durable plastic or other semi-permanent liquid-proof sheet material provided with stitchings 11 and 12 respectively at its bottom and side, with pairs of spaced stitching 13 around its mouth or open end and an additional pair of stitchings 14 spaced inwardly therefrom and with the mouth of the bag reversely folded upon itself and secured beneath such stitchings 13 and 14, the edge of the envelope being caught beneath the innermost stitching 14.

The reversely folded portion of the bag provides a reinforcing band 15 disposed around the open end of the envelope or mouth of the bag and through this there are a pair of openings 16 and 17 on opposite sides of the bag about which there are reinforcing stitchings 18 and 19. The openings 16 and 17 are circular in order that the material about them will have the greatest strength and such openings are distortible to permit the application of the bag over a knob 20 on the instrument panel 21 of an automobile or the like, or if desired, the bag may be suspended on the crank or handle 22 or 23 of the automobile door.

A utility strap 24 is provided having longitudinally disposed stitching lengthwise of the strap. This strap is applied by providing a slit 26 the width of the strap in the reversely folded edge portion of the material of the envelope prior to the application of the stitchings 13 and 14 and the end of the strap is inserted across the width of the reinforcing band and prior to the application of the stitchings 13 and 14 by which it is secured in place.

The strap 24 may be used to attach the device to a support to secure the mouth of the bag in closed position as illustrated in Fig. 3, or as a carrying handle as illustrated in Fig. 4.

In view of the fact that the bag is composed of relatively inexpensive sheet material of plastic or the like and which is sufficiently transparent to permit the observation of articles therethrough, it may be used as a shopping bag or for the containing of articles to be used so that when emptied it may then be used as a collector for waste material, to hold soft drink or other bottles and to retain any liquid frequently left after the consuming of a soft drink from such a bottle. If desired, the bag may be readily discarded after it is used and becomes soiled interiorly or otherwise.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A bag for the collection of waste comprising an envelope of relatively thin semi-transparent waterproof plastic, one end of said envelope being open and the other end being closed, a relatively wide reinforcing band provided around the margin of the open end of said envelope providing a double thickness, said band having generally circular openings therethrough at oppositely-disposed portions of said bag and with reinforcing stitching around said openings, a utility strap having one end attached between the thickness of the material of the reinforcing band at the mouth of the envelope, said strap being provided with longitudinal reinforcing stitching, said envelope being adapted to be applied to a supporting projection so that the latter extends through one of said openings, said strap serving the threefold function of supplemental securing means, for carrying the envelope with the strap tied through the opposite opening in the reinforcing band, and around the mouth of the envelope for securing the latter in closed position.

2. A bag for the collection of waste comprising an envelope of relatively thin semi-transparent material, one end of said envelope being open and the other end being closed, a relatively wide reinforcing band provided around the margin of the open end of said envelope providing a double thickness, said band having generally circular openings therethrough at oppositely-disposed portions of said bag and with reinforcing stitching around said openings, a utility strap having one end attached between the thicknesses of the material of the reinforcing band at the mouth of the envelope, said strap being provided with longitudinal reinforcing stitching and said envelope being adapted to be applied to a supporting projection so that the latter extends through one of said openings.

3. A bag for the collection of waste comprising an envelope, one end of said envelope being open and the other end being closed, a relatively wide reinforcing band provided around the margin of the open end of said envelope providing a double thickness, said band having openings therethrough at oppositely-disposed portions of said bag and with reinforcing around said openings, a utility strap having one end attached between the thicknesses of the material of the reinforcing band at the mouth of the envelope, said envelope being adapted to be applied to a supporting projection so that the latter extends through one of said openings, said strap serving the three-fold function of supplemental securing means, for carrying the envelope with the strap tied through the opposite opening in the reinforcing band, and around the mouth of the envelope for securing the latter in closed position.

4. A bag for containing articles, said bag being composed of an envelope of relatively thin semi-transparent plastic with one end of said envelope open and the other end closed, said envelope having a relatively wide multi-layer reinforcing band around the margin of the same and with openings through such reinforcing band at oppositely-disposed portions of said envelope, said openings being generally circular and with stitching around the margin thereof, a utility strap with longitudinal reinforcing stitching having one end portion secured between the layers of said reinforcing band, said strap serving the three-fold function of supplement securing means, for carrying the envelope with the strap tied through the opposite opening in the reinforcing band, and around the mouth of the envelope for securing the latter in closed position.

References Cited in the file of this patent

UNITED STATES PATENTS

| | | |
|---|---|---|
| 1,382,394 | Spurgin | June 21, 1921 |
| 1,428,617 | Thaw | Sept. 12, 1922 |
| 2,631,629 | Lee | Mar. 17, 1953 |
| 2,740,446 | Roeckl | Apr. 3, 1956 |
| 2,761,481 | Boatwright | Sept. 4, 1956 |
| 2,861,615 | Kimmel | Nov. 25, 1958 |